(12) United States Patent
Hasha

(10) Patent No.: US 7,353,271 B2
(45) Date of Patent: *Apr. 1, 2008

(54) METHOD AND SYSTEM FOR TRACKING CLIENTS

(75) Inventor: Richard Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

This patent is subject to a terminal disclaimer.

(21) Appl. No.: 10/723,121

(22) Filed: Nov. 26, 2003

(65) Prior Publication Data

US 2004/0107280 A1 Jun. 3, 2004

Related U.S. Application Data

(62) Division of application No. 09/322,962, filed on May 28, 1999, now Pat. No. 6,684,246.
(60) Provisional application No. 60/118,668, filed on Feb. 3, 1999.

(51) Int. Cl.
*G06F 15/173* (2006.01)
(52) U.S. Cl. ............... 709/224; 709/223; 719/332
(58) Field of Classification Search ............ 709/246, 709/203, 223–230, 216, 236, 201, 224, 227, 709/245; 340/825; 370/252, 236; 702/189; 714/39; 705/37, 21; 719/318, 332; 700/181
See application file for complete search history.

(56) References Cited

U.S. PATENT DOCUMENTS 5,210,757 A * 5/1993 Barlow et al. ............. 714/25
5,267,238 A * 11/1993 Yano et al. ................ 370/452
5,471,629 A * 11/1995 Risch ........................ 707/201
5,522,077 A    5/1996 Cuthbert et al. ............ 395/700

(Continued)

FOREIGN PATENT DOCUMENTS

| EP | 0816968 A2 | 1/1998 |
| WO | WO 94/11810 | 5/1994 |

OTHER PUBLICATIONS

Phantom: A Simple and Effective Flow Control Scheme – Afek, Mansour, Ostfeld (1996) www.math.tau.ac.il/~ostfeld/papers/phantom.ps.Z.*
Quantification and Improvement of the.. –Sijbers.. (1996) www.ruca.ua.ac.be/visielab/../papers/sijbers/mri96.pdf.*
The Salzburg NTN–Method for the Radon Transform: Introduction.. –Hausenblas (1994) ftp.risc.uni–linz.ac.at/pub/acpc/reports/acpc.95–1.ps.gz.*

(Continued)

*Primary Examiner*—Thong Vu
(74) *Attorney, Agent, or Firm*—Woodcock Washburn LLP

(57) ABSTRACT

A method and system for tracking access by clients to a server object of a server class. The client tracking system provides a derived client tracking server class that includes an overriding implementation of a query function of the server class. The overriding implementation instantiates a phantom server object and returns a pointer to the instantiated phantom server object. The phantom server object has functions that correspond to and override the functions of the server class. These overriding functions perform custom processing on a client-by-client basis and forward their invocation to be corresponding functions of the server object. When a client invokes the query function of the client tracking server object, a pointer to a phantom server object is returned. From then on, when that client invokes a function of the phantom server object, custom processing can be performed for that client.

4 Claims, 17 Drawing Sheets

U.S. PATENT DOCUMENTS

| | | | | |
|---|---|---|---|---|
| 5,542,078 A | * | 7/1996 | Martel et al. | 707/101 |
| 5,708,834 A | | 1/1998 | Sasaki et al. | 709/203 |
| 5,710,887 A | * | 1/1998 | Chelliah et al. | 705/26 |
| 5,724,588 A | | 3/1998 | Hill et al. | 709/328 |
| 5,742,588 A | * | 4/1998 | Thornberg et al. | 370/236 |
| 5,764,915 A | * | 6/1998 | Heimsoth et al. | 709/227 |
| 5,809,235 A | * | 9/1998 | Sharma et al. | 709/230 |
| 5,862,325 A | * | 1/1999 | Reed et al. | 709/201 |
| 5,872,973 A | * | 2/1999 | Mitchell et al. | 719/332 |
| 5,938,733 A | * | 8/1999 | Heimsoth et al. | 709/230 |
| 5,940,840 A | * | 8/1999 | Eshel et al. | 707/205 |
| 5,960,410 A | * | 9/1999 | Halpern | 705/21 |
| 5,970,468 A | | 10/1999 | Bull | 705/11 |
| 6,018,619 A | | 1/2000 | Allard et al. | 709/224 |
| 6,021,438 A | | 2/2000 | Duvvoori et al. | 709/224 |
| 6,038,302 A | * | 3/2000 | Burok et al. | 379/201.01 |
| 6,060,994 A | * | 5/2000 | Chen | 340/521 |
| 6,108,661 A | | 8/2000 | Caron et al. | 707/102 |
| 6,115,646 A | * | 9/2000 | Fiszman et al. | 700/181 |
| 6,119,125 A | * | 9/2000 | Gloudeman et al. | 707/103 R |
| 6,122,627 A | | 9/2000 | Carey et al. | 707/4 |
| 6,125,363 A | | 9/2000 | Buzzeo et al. | 707/101 |
| 6,151,637 A | * | 11/2000 | Phillips et al. | 709/201 |
| 6,160,987 A | * | 12/2000 | Ho et al. | 434/350 |
| 6,178,457 B1 | | 1/2001 | Pitchford et al. | 709/228 |
| 6,199,195 B1 | | 3/2001 | Goodwin et al. | 717/1 |
| 6,226,670 B1 | | 5/2001 | Banda et al. | 709/315 |
| 6,269,362 B1 | | 7/2001 | Broder et al. | 707/4 |
| 6,301,557 B1 | | 10/2001 | Miller et al. | 704/223 |
| 6,308,216 B1 | * | 10/2001 | Goldszmidt et al. | 709/236 |
| 6,317,749 B1 | * | 11/2001 | Ghatate | 707/103 R |
| 6,336,101 B1 | | 1/2002 | Dean et al. | 705/29 |
| 6,363,393 B1 | | 3/2002 | Ribitzky | 707/102 |
| 6,405,317 B1 | * | 6/2002 | Flenley et al. | 726/4 |
| 6,466,663 B1 | | 10/2002 | Ravenscroft et al. | 379/265 |
| 6,473,791 B1 | | 10/2002 | Al-Ghosein et al. | 709/217 |
| 6,505,344 B1 | * | 1/2003 | Blais et al. | 717/151 |
| 6,591,305 B2 | * | 7/2003 | Densmore | 709/245 |
| 6,594,705 B1 | * | 7/2003 | Philyaw | 709/238 |
| 6,631,409 B1 | * | 10/2003 | Watson et al. | 709/224 |
| 6,658,487 B1 | * | 12/2003 | Smith | 719/318 |
| 6,671,707 B1 | * | 12/2003 | Hudson et al. | 707/206 |
| 6,684,246 B1 | * | 1/2004 | Hasha | 709/224 |
| 6,690,761 B2 | * | 2/2004 | Lang et al. | 378/56 |
| 6,691,148 B1 | * | 2/2004 | Zinky et al. | 709/201 |
| 6,744,403 B2 | * | 6/2004 | Milnes et al. | 342/357.07 |
| 6,947,959 B1 | * | 9/2005 | Gill | 715/501.1 |
| 6,963,899 B1 | * | 11/2005 | Fernandez et al. | 709/203 |
| 2003/0131290 A1 | * | 7/2003 | Weinberg et al. | 714/46 |
| 2003/0191842 A1 | * | 10/2003 | Murphy et al. | 709/226 |

OTHER PUBLICATIONS

A software defect report and tracking system in an intranet□□ Monteiro, A.; A.B.; Goulao, M.; Abreu, F.B.; Sousa, P.;Software Maintenance and Reengineering, 1999. Proceedings of the Third European Conference on Mar. 3–5, 1999 pp: 198–201.*

The parallelized Implementation of the Salzburg NTN–Method for.. –Hausenblas (1994) a Test Program To test the algorithm a phantom object of superimposed ellipses will be designed. picard.coma.sbg.ac.at/coma/projects/cei/papers/zint–wp5/D5Z–2a.ps.gz.*

Quantification and Improvement of the..—Sijbers.. (1996) www.ruca.ua.ac.be/visielab/sijbers/../papers/sijbers/mri96.pdf.*

3–D Scene Data Recovery using Omnidirectional Multi-baseline..—Kang, Szeliski (1995) crl.dec.com/pub/.dec/CRL/tech–reports/95.6.ps.Z.*

The AT&T Internet Difference Engine: Tracking and..—Douglis, Ball, Chen, .. (1998) www.research.att.com/~douglis/papers/aide.ps.gz.*

Merl A Mitsubishi Electric Research Laboratory—Http Www Merl www.merl.com/papers/docs/TR97–15.pdf.*

The Salzburg NTN–Method for the Radon Transform: Introduction..—Hausenblas (1994) ftp.risc.uni–linz.ac.at/pub/acpc/reports/acpc.95–1.ps.gz.*

Escape Analysis for Java—Choi (1999) ; www.research.ibm.com/people/g/gupta/escape.ps.*

Guaranteeing the Topology of an Implicit Surface..—Stander, Hart (1997) ftp.eecs.wsu.edu/pub/hart/repoly–dist.ps.gz.*

Phantom: A Simple and Effective Flow Control Scheme—Afek, Mansour, Ostfeld (1996) www.math.tau.ac.il/~ostfeld/papers/phantom.ps.Z.*

Shklar et al., MetaMagic: Generating Virtual Web Sites through Data Modeling. www.scpoe.gmd.de/info/www6/posters/714/poster714. 1997.

World Wide Web Database: Developer's Guide with Visual Basic 5. http://nps.vnet.ee/ftp/Docs/Internet/We...Guide%20With%20Visual%20Basic/index. 1998.

* cited by examiner

PhantomMgr:BasePhantomMgr

PhantomServer:IServer

METHOD AND SYSTEM FOR TRACKING CLIENTS

CROSS-REFERENCE TO RELATED APPLICATIONS

This application is a divisional of U.S. patent application Ser. No. 09/322,962, filed May 28, 1999 now U.S. Pat. No. 6,684,246, entitled "METHOD AND SYSTEM FOR TRACKING CLIENTS," and is related to U.S. Pat. No. 6,721,898, entitled "METHOD AND SYSTEM FOR TRACKING SOFTWARE COMPONENTS," filed on May 28, 1999; U.S. Pat. No. 6,704,924, filed May 28, 1999, entitled "METHOD AND SYSTEM FOR IMPLEMENTING VIRTUAL FUNCTIONS OF AN INTERFACE," filed on May 28, 1999; U.S. patent application Ser. No. 09/322,643, entitled "AUDIO VISUAL ARCHITECTURE," filed on May 28, 1999; U.S. Pat. No. 6,670,934, entitled "METHOD AND SYSTEM FOR DISTRIBUTING ART," filed on May 28, 1999; U.S. patent application Ser. No. 09/322,964, entitled "METHOD AND SYSTEM FOR GENERATING A USER INTERFACE FOR DISTRIBUTED DEVICES," filed May 28, 1999; U.S. patent application Ser. No. 09/322,852, entitled "METHOD AND SYSTEM FOR MANAGING SOFTWARE COMPONENTS," filed on May 28, 1999; and U.S. patent application Ser. No. 09/322,457, entitled "METHOD AND SYSTEM FOR PROPERTY NOTIFICATION," filed on May 28, 1999; and U.S. Pat. No. 6,466,234, entitled "METHOD AND SYSTEM FOR CONTROLLING ENVIRONMENTAL CONDITIONS," filed on May 28, 1999, the disclosures of which are incorporated herein by reference.

FIELD OF THE INVENTION

The disclosure relates generally to object-oriented programming techniques and, more specifically, to a system for automatically tracking client references to a server.

BACKGROUND OF THE INVENTION

It has been a goal of the software industry to develop standard software components that can be reused and that can be easily combined to form complex systems. It is envisioned that the functionality provided by these software components would be described in much the same way that a data sheet describes a hardware component (e.g., a special-purpose telecommunications chip). Various object models have been defined that provide a standard interconnection mechanism between software components. Under these object models, software components are "objects" in the object-oriented sense, and the software components provide "interfaces" through which their functionality can be accessed. By using interfaces, objects can expose their functionality independently of the implementation of the functionality. In the C++ programming language, an interface is an abstract class whose virtual functions are all pure. A pure virtual function is one that has no implementation in the class. Thus, an interface defines only the order of the virtual functions within the class and the signatures of the virtual functions, but not their implementations. The following is an example of an interface:

```
class IShape
{
virtual void draw(int x,y)=0;
virtual void save(char filename)=0;
virtual void clear(int x,y)=0;
}
```

This interface, named "IShape," has three virtual functions: draw, save, and clear. The "=0" after the formal parameter list indicates that each virtual function is pure. Concepts of the C++ pro language that support object-oriented programming are described in "The Annotated C++ Reference Manual," by Ellis and Stroustrup, published by Addison-Wesley Publishing Company in 1990, which is hereby incorporated by reference.

Once an interface is defined, programmers can write programs to access the functionality independent of the implementation. Thus, an implementation can be changed or replaced without having to modify the programs that use the interface. For example, the save function of the IShape interface may have an implementation that saves the shape information to a file on a local file system. Another implementation may save the shape information to a file server accessible via the Internet.

To ensure that an implementation provides the proper order and signatures of the functions of an interface, the class that implements the interfaces inherits the interface. The following is an example of a class definition that implements the IShape interface.

```
class Shape: IShape
{
virtual void save(char filename) {...};
virtual void clear(int x,y){...};
virtual void draw(int x,y){...};
virtual void internal saver{...};
int x;
int y;
}
```

The first line of the class definition indicates by the ": IShape" that the Shape class inherits the IShape interface. The ellipses between the braces indicate source code that implements the virtual functions. The Shape class, in addition to providing an implementation of the three virtual functions inherited from the IShape interface, also defines (i.e., introduces) a new virtual function "internal_save," which may be invoked by one of the implementations of the other virtual functions. The Shape class also has defined two integer data members, x and y.

Typical C++ compilers generate virtual function tables to support the invocation of virtual functions. When an object for a class is instantiated, such a C++ compiler generates a data structure that contains the data members of the object and that contains a pointer to a virtual function table. The virtual function table contains the address of each virtual function defined for the class. FIG. 1 illustrates a sample object layout for an object of the Shape class. The object data structure 101 contains a pointer to a virtual function table and the data members x and y. The virtual function table 102 contains an entry for each virtual function. Each entry contains the address of the corresponding virtual function. For example, the first entry in the virtual function table contains the address of the draw function 103. The order of the references in the virtual function table is the same as defined in the inherited interface even though the Shape class specifies these three functions in a different order. In particular, the reference to the draw function is first, followed by the references to the save and clear functions.

The inheritance of interfaces allows for references to objects that implement the interfaces to be passed in an implementation independent manner. A routine that uses an implementation may define a formal argument that is a pointer to the IShape interface. The developer of the routine can be unaware that the implementation is actually the Shape class. To pass a reference to an object of the Shape class, a program that invokes the routine would type cast a pointer to the object of the Shape class to a pointer to the IShape interface. So long as the pointer points to a location that contains the address of the virtual function table and the virtual function table contains the entries in the specified order, the invoked routine can correctly access the virtual functions defined by the IShape interface.

One popular object model that specifies a mechanism for interconnecting components is Microsoft's Component Object Model ("COM"). COM is more fully described in "Inside COW" by Dale Rogerson and published by Microsoft Press in 1997. COM specifies that each object is to implement an interface referred to as the IUknown interface. The IUnknown interface provides a query interface function, an add reference function, and a release function. The query interface function is passed the identifier of an interface that the object supports and returns a reference to that interface. The add reference and the release functions are used for reference counting the object. Each object that conforms to COM implements the IUknown interface.

A client object that requests to instantiate a COM object may receive a pointer to the IUknown interface in return. The client may then invoke the query interface function passing the identifier of another interface supported by that COM object. The query interface function returns a pointer to the requested interface. The client can then use the pointer to invoke one of the functions of the requested interface. As mentioned above, each interface of a COM object inherits the IUknown interface. Thus, each of these interfaces provides access to other interfaces and provides reference counting. Whenever a client duplicates a pointer to an interface of a COM object, the client is expected to invoke the add reference function, which increments the reference count to that COM object. Whenever the client no longer needs a pointer to an interface to a COM object, the client is expected to invoke the release function, which decrements the reference count to that COM object and destructs the COM object when the reference count goes to 0.

FIG. 2A is a block diagram illustrating conventional interconnections between a server object and client objects. In this example, server object 2A01 includes an interface 2A02. Once the server object is instantiated, various client objects 2A03–2A06 may request a pointer to an interface of the server object using the query interface function. The server object may have no way of identifying which client object invokes a function of the interface. For example, when client object 2A03 invokes a function, the server object cannot determine whether it is client object 2A03 or client object 2A04 that is invoking the function. Some server objects may be developed so that they can identify the individual client object that is invoking a function. Such server objects may provide each client object with its own identifier. For example, after a client object invokes a query interface function of the server object to retrieve a pointer to an interface, the client object, by convention, may then invoke a function of that interface which returns a unique identifier for that client object. When the client object subsequently invokes a function of the interface, the client object passes its unique identification so that the server object can uniquely identify each client that invokes a function.

Such server objects that can uniquely identify clients have a couple of disadvantages. First, the cost of development of such server objects is increased because of the additional code that is needed to support the unique identifications of client objects. Second, each client object needs to be programmed to receive and provide its unique identification. It would be desirable to have a technique in which existing server objects could be used in such a way so that each client object can be individually identified when it invokes a function. It would be also useful if such a technique would not require any modification to existing server class definitions and client class definitions.

FIG. 2B illustrates a typical inheritance of a server class (i.e., Server) by a derivation server class (i.e., DServer). In this example, an instance of the Server class 2B01 inherits the IUnknown interface and includes data members 2B02 and function members 2B03. The function members may include the functions of the IUknown interface and various other functions (e.g., func 1). The DServer class 2B04 inherits the Server class and includes data members 2B05 and function 2B06. The data members include the inherited data members from the Server class and other data members that may be introduced in the DServer class. The functions include the inherited functions from the Server class and other functions that may be introduced in the DServer class. The DServer class provides implementations for each in introduced functions and may provide overriding implementations for the inherited functions.

SUMMARY OF THE INVENTION

A method and system for tracking access by clients to a server object of a server class is provided. In one embodiment, the client tracking system provides a derived client tracking server class that includes an overriding implementation of a query function of the server class. The overriding implementation instantiates a phantom server object and returns a pointer to the instantiated phantom server object. The phantom server object has functions that correspond to and override the functions of the server class. These overriding functions perform custom processing on a client-by-client basis and forward their invocation to the corresponding functions of the server object. When a client invokes the query function of the client tracking server object, a pointer to a phantom server object is returned. From then on, when that client invokes a function of the phantom server object, custom processing can be performed for that client.

In one embodiment, the client tracking system specifies a phantom manager class for controlling the instantiation and destruction of the phantom server objects. The phantom manager class may provide a create function that, when invoked by the query function of the client tracking server object, instantiates a phantom server object and returns a pointer to the phantom server object. The phantom manager class may also provide a phantom going away function that, when invoked by a destructor of a phantom server object, performs custom processing upon destruction of a phantom server object. A developer who wants to track client accesses to a server class that is already defined may specify a derivation of the server class, referred to as a "client tracking server class." The developer may provide an overriding function of the query function as part of the client tracking server class. The developer may also provide an implementation of the create function and the phantom going away function of the phantom manager class that are tailored to the server class. In addition, the developer may provide implementations of the functions of the server class as part of the phantom server object. These implementations of functions of the phantom server object may perform the desired custom processing on a client-by-client basis.

DETAILED DESCRIPTION OF ILLUSTRATIVE EMBODIMENTS

Figure 1:
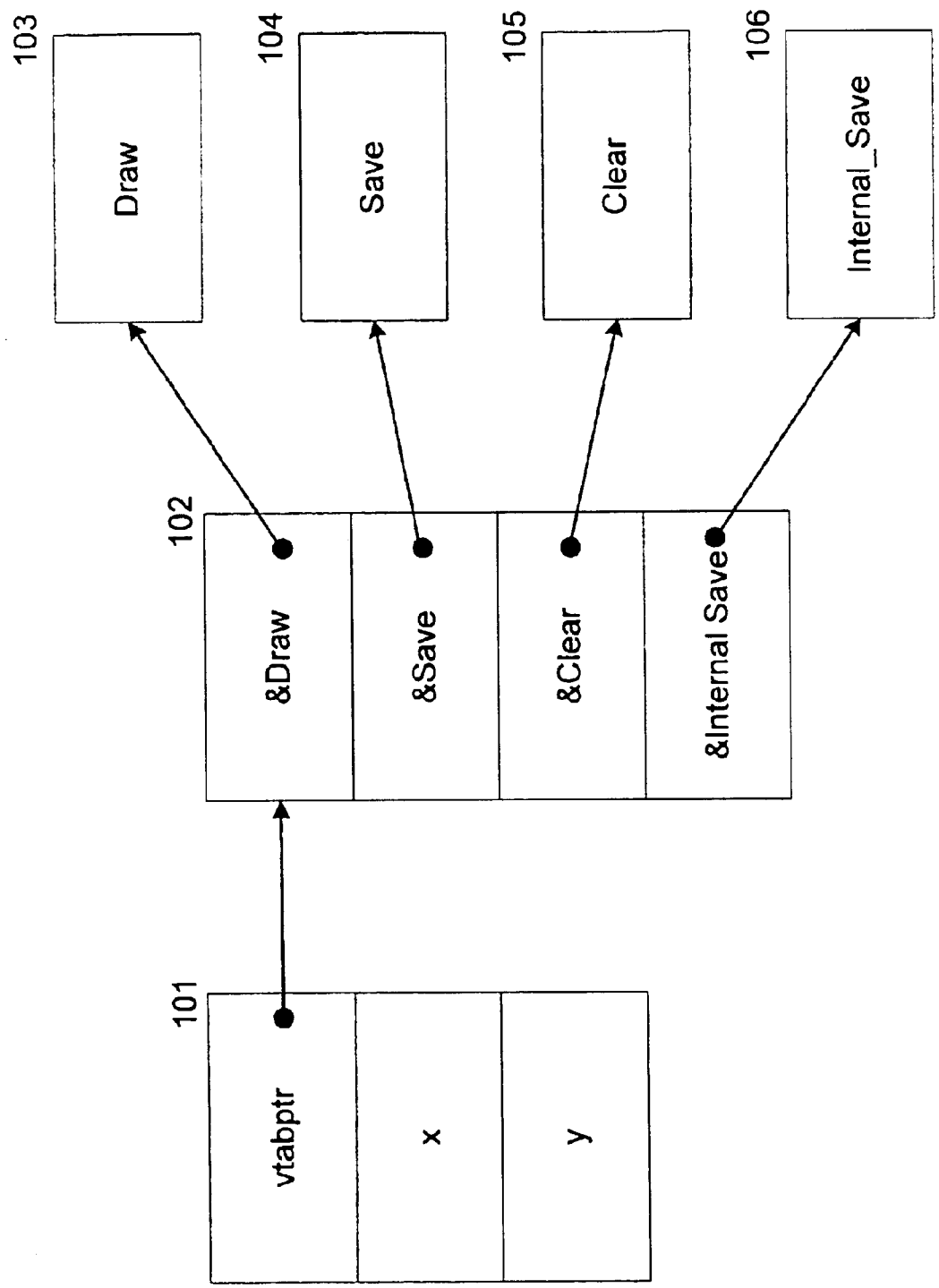
FIG. 1 illustrates a sample object layout for an object of the Shape class.
Figure 2A:
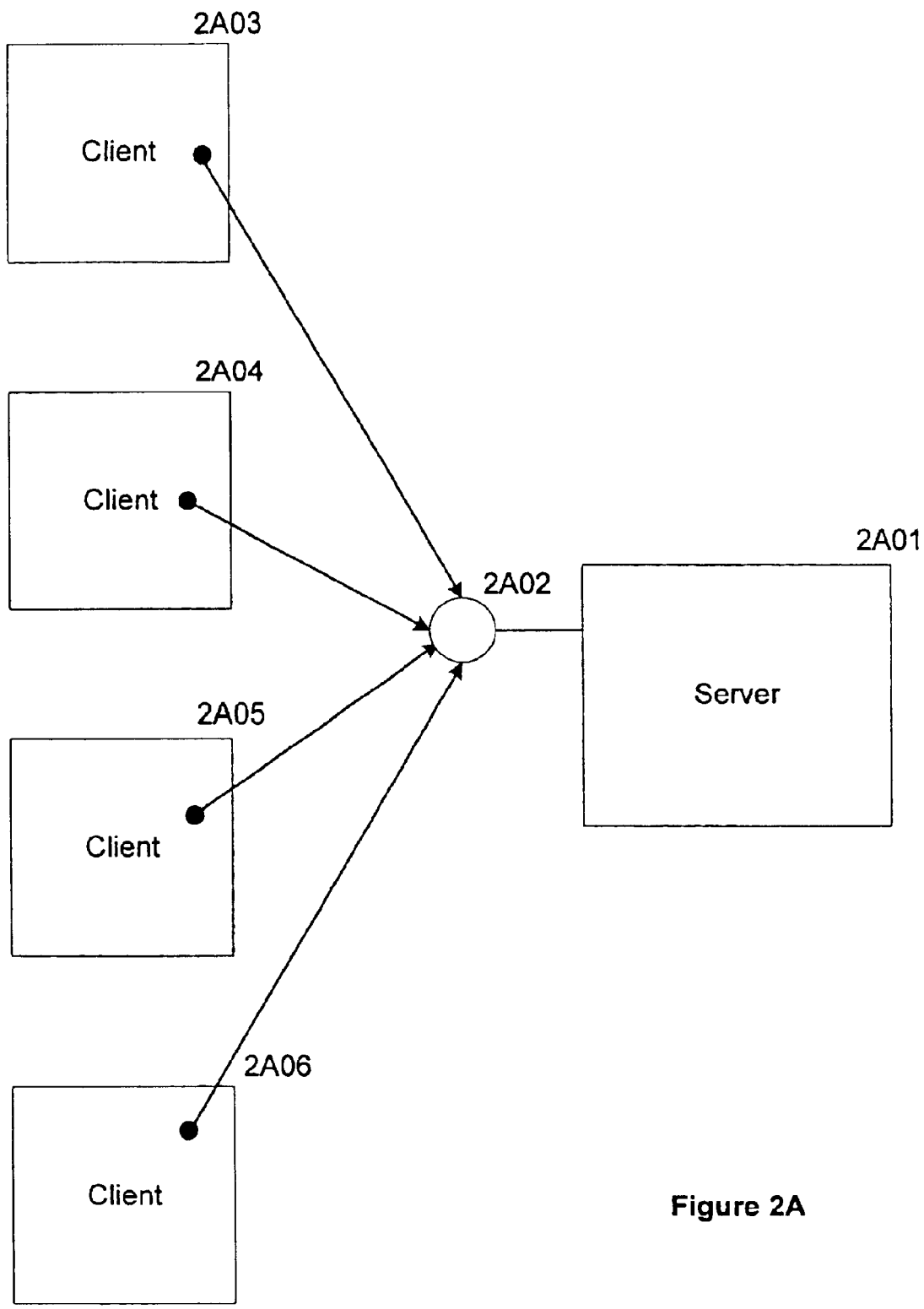
FIG. 2A is a block diagram illustrating conventional interconnections between a server object and its client objects.
Figure 2B:
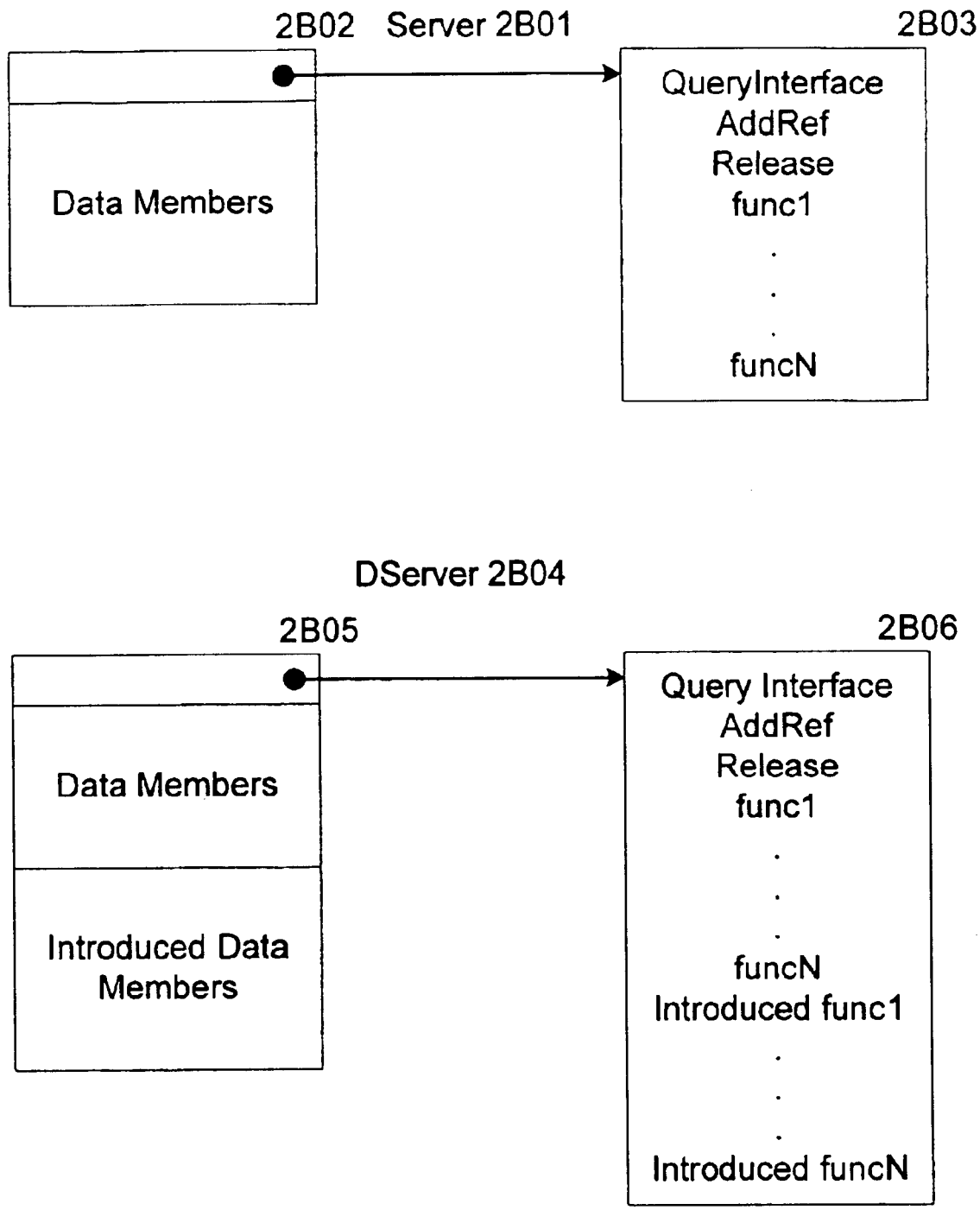
FIG. 2B illustrates a typical inheritance of a server class (i.e., Server) by a derivation server class (i.e., DServer).

A method and system for tracking access by clients to a server object is provided. The client tracking system allows access to a server object to be tracked on a client-by-client basis that, in one embodiment, is without modification of the server class definition. The client tracking system provides a client tracking server class that is a derivation of the server class. The client tracking server class includes an implementation of a query interface function that overrides the query interface function of the server class. When the query interface function of the client tracking server class is invoked, it instantiates a phantom server object that provides an implementation of the same interface as provided by the server class (e.g., "IServer"). The query interface function returns a pointer to the phantom server object. When the client invokes a function of the phantom server object, that function can perform custom processing and forward the invocation to the corresponding function of the client tracking server object. The custom processing may include, for example, tracking which client invokes a certain function and then performing an alternate behavior when that same client invokes another function. The custom processing can, however, include any processing that is dependent upon identifying whether a certain client invokes a certain function of the server class.

In one embodiment, the client tracking system provides a phantom server class that includes functions corresponding to and having the same signature as the functions of the server class. The client tracking system also provides a phantom manager class for instantiating phantom server objects, for tracking the phantom server objects, and for returning pointers to the phantom server objects. The phantom manager class may have a create function that when invoked by the client tracking server object instantiates a phantom server object. The phantom manager class may also have an instance going away function that is invoked when a phantom server object is destructed so that custom processing may be performed when a client releases a reference to a phantom server object that causes the reference count to go to 0. The phantom manager class may also have a create instance function that is customized to create an instance of a particular client tracking server object. When the query interface function of the client tracking server object is invoked, it invokes the create function of the phantom manager object, which in turn invokes the create instance function. The create instance function of the phantom manager object is tailored to create an instance of the phantom server object for the specific client tracking server object. The query interface function returns a pointer to this phantom server object. When the pointer to the phantom server object is released and the reference count goes to 0, the destructor of the phantom server object invokes the going away function of the phantom manager object. The phantom going away function performs any custom processing needed when a phantom server object is destructed.

Figure 3:
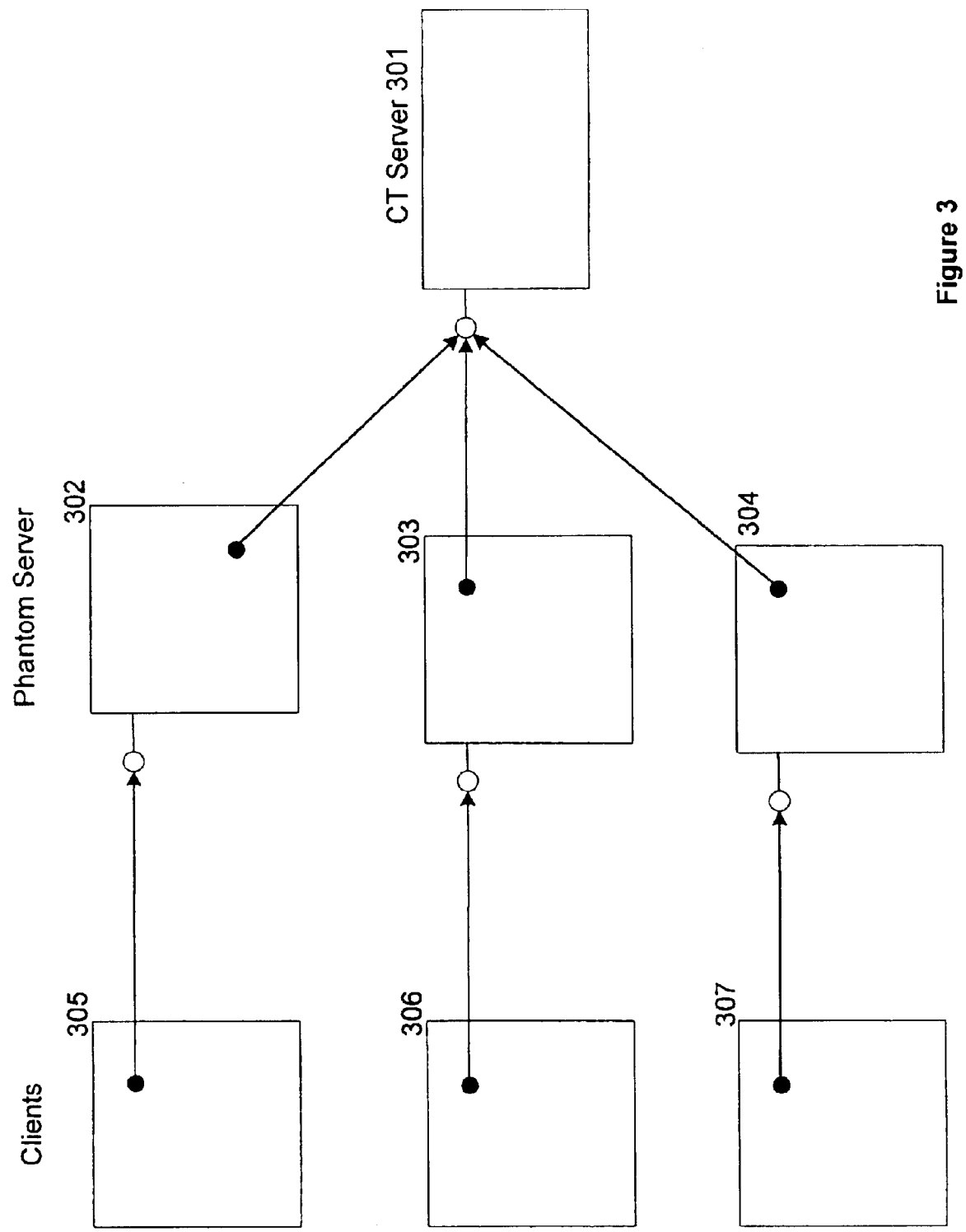
FIG. 3 is a block diagram illustrating components of the client tracking system in one embodiment.

FIG. 3 is a block diagram illustrating components of the client tracking system in one embodiment. The components include a client tracking server object 301 ("CT server object") and phantom server objects 302–304, which are accessed by client objects 305–307. The CT server class inherits the Server class and provides the client tracking functionality. The CT server object provides its interface to client objects through the phantom server objects. That is, each client object, when it requests an interface from the CT server object, is provided with a pointer to an interface of a phantom server object, rather than to the interface of the CT server object. Whenever a client object invokes the query interface function of the CT server object or a query interface function of a phantom server object, the function returns a pointer to a phantom server object. A phantom server object effectively inherits an IServer interface so that it includes functions with the same signature and with the same order of the Server class. In general, the functions of the phantom server objects forward their invocations to the CT server object. The functions of a phantom server object can perform custom processing before or after they invoke the corresponding function of the CT server object. In this way, the phantom server functions can perform specialized processing for each client object. If a client object duplicates a pointer, then the client tracking system would consider that both pointers belong to the same client object, even though the client object passes the duplicate pointer to another object. The client tracking system may be implemented on a conventional computer system that includes a central processing unit, a memory and input/out devices. In addition, the client objects and server object may be instantiated in the same process or in different processes that may be executing on different computer systems. The components of the client tracking system may be stored on a computer-readable medium such as memory, disk, or CD-ROM and may be transmitted via a computer-readable data transmission medium. Since these data structures may be accessed concurrently by multiple threads of execution, a concurrency management technique is used when accessing these data structures. For example, when accessing the data structures, a thread may lock the data structure and unlock it when access is complete. In the following, the description of the functions that access these data structures omit these well-known concurrency management techniques.

Figure 4:
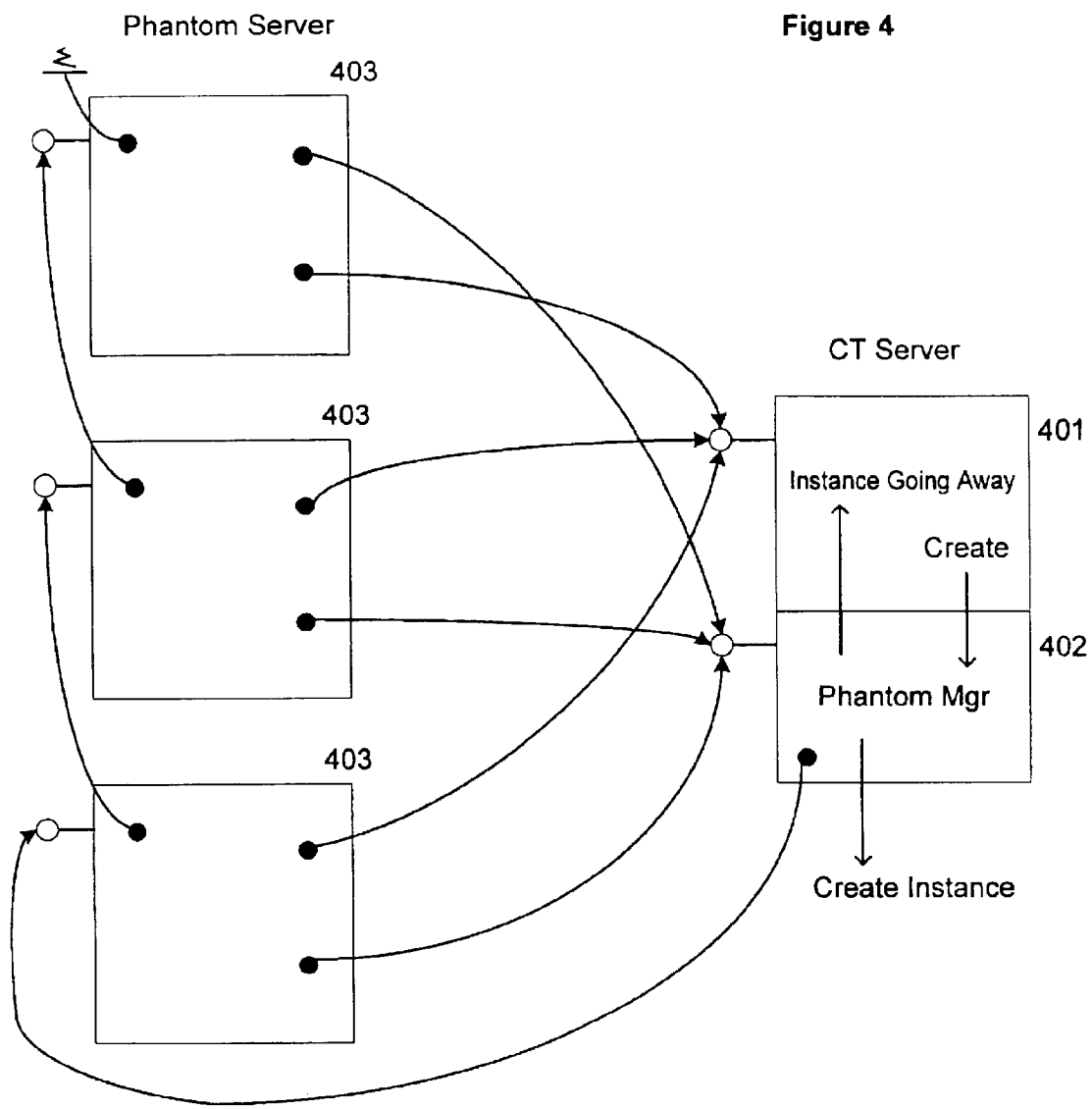
FIG. 4 is a block diagram illustrating components of the client tracking system of one embodiment in more detail.

FIG. 4 is a block diagram illustrating components of the client tracking system of one embodiment in more detail. The components include a CT server object 401, a phantom manager object 402, and phantom server objects 403. The server class whose access by client objects is to be tracked is a base class of CT server class. The CT server class introduces a data member that is a phantom manager object. In addition, CT server class overrides the query interface function of the server class. The phantom manager class may have a base implementation of its functions and may provide an overriding implementation of a create instance function and an instance going away function. The create instance function creates phantom server object that inherits the interface of the server class. The instance going away function is invoked to perform custom processing when a client object has released all its pointers to the phantom server object. The phantom manager object is responsible for creating the phantom server objects when notified by the CT server object by an invocation of a create function of the phantom manager object. The CT server object would typically invoke the create function during invocation of the query interface function of the CT server object. When a phantom server object detects that its reference count has gone to 0, it invokes a going away function of the phantom manager object. That going away function then invokes the instance going away function to perform custom processing. In this way, the client tracking system can perform processing through the query interface function when a client object is given a pointer and through the invocation of the instance going away function when a client object releases a pointer and the reference count goes to 0.

Figure 5:
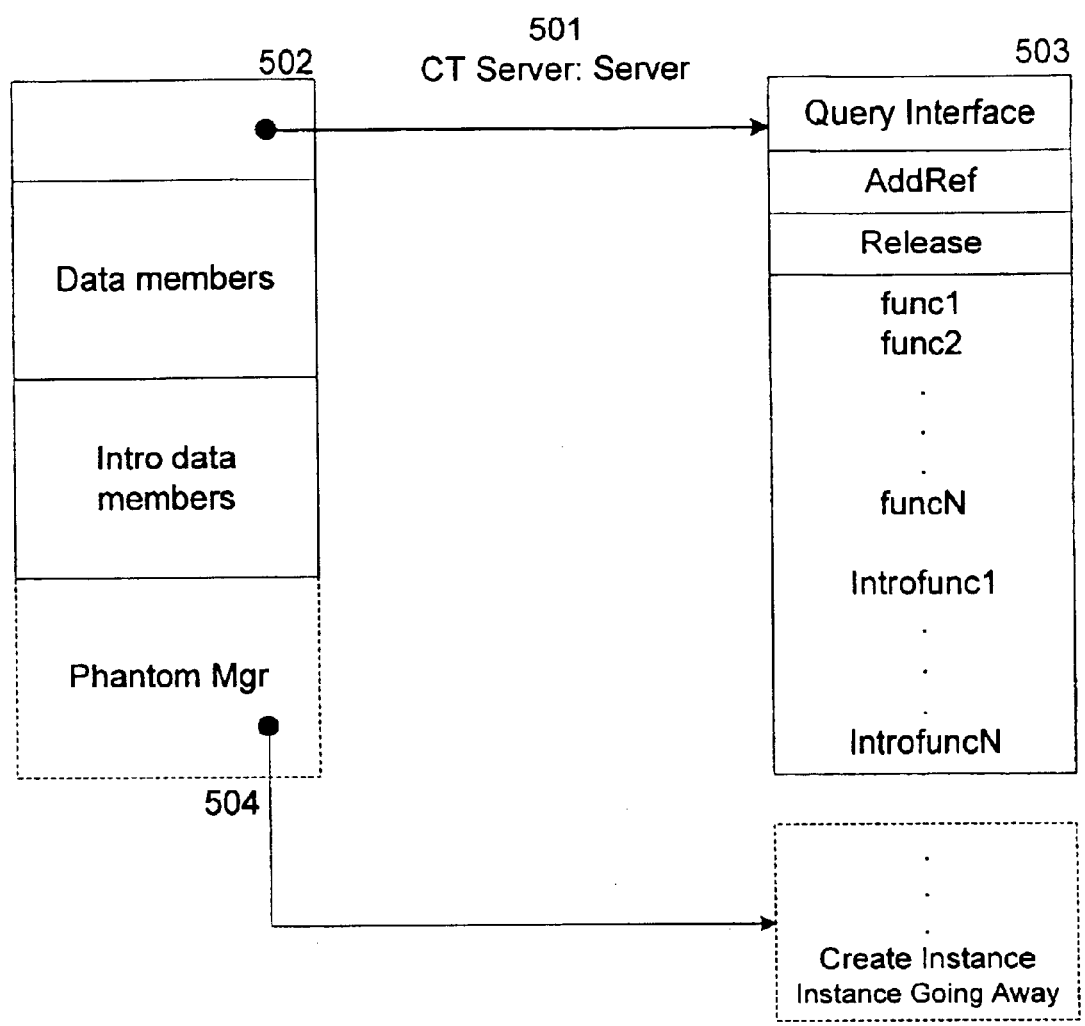
FIG. 5 is a block diagram illustrating an example object layout of the CT server class.

FIG. 5 is a block diagram illustrating an example object layout of the CT server class. In this example, the CT server object includes the phantom manager object as a data member. A developer who wants to track accesses to the server object on a client-by-client basis would provide a derivation of the server class that includes a phantom manager object and provides an implementation of the query interface function that overrides the query interface function of the server class. Alternatively, if the query interface function invokes another function by convention, then that other function may be overridden. The implementation of the query interface function invokes the create function of the phantom manager object and returns, as the pointer to the requested interface, the pointer returned by the create function. The developer would provide an overriding implementation of the create instance function that is customized to instantiate phantom server objects of a class that inherits the same interface (e.g., IServer) as the server class. If the developer wants to provide custom processing when a client object releases its pointer and the reference count goes to 0, then the developer may provide an overriding implementation of the instance going away function of the phantom manager class. The developer could also introduce additional data members and functions in the CT server class to support the custom processing.

Figure 6:
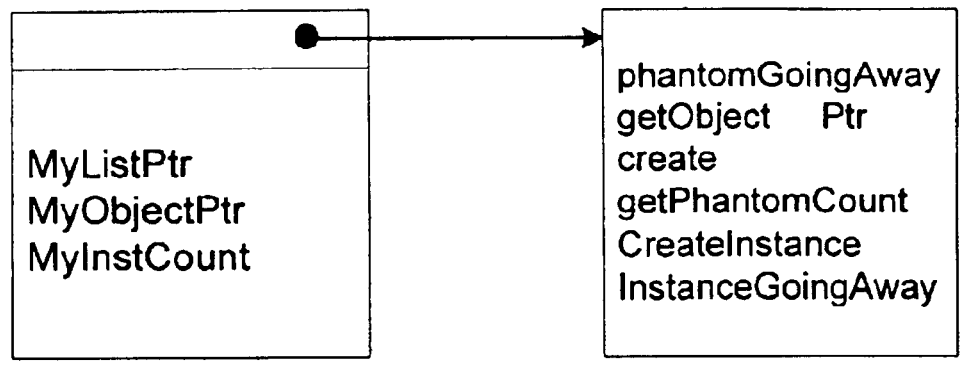
FIG. 6 is a block diagram illustrating an example object layout for the phantom manager class.

FIG. 6 is a block diagram illustrating an example object layout for the phantom manager class. The phantom manager class may inherit a base phantom manager class that includes the data members and functions of Table 1.

TABLE 1

| Member | Description |
|---|---|
| PhantomGoingAway | A function that is invoked by a phantom object to notify the phantom manager that the phantom object is being destructed |
| GetObjectPtr | A function that returns a pointer to the embedding CT object |
| Create | A function that is typically invoked by the query interface function of the CT object to create a phantom object |
| GetPhantomCount | A function that returns the number of phantom objects currently managed by this phantom manager |
| CreateInstance | A function that may be provided by the developer of a phantom server class to instantiate a phantom server object and that is invoked by the create function |
| InstanceGoingAway | A function that may be provided by the developer of the CT server class and that is invoked by the phantom going away function |
| MyListPtr | A pointer to phantom objects of this phantom manager object |
| MyObjectPtr | A pointer to the CT object in which the phantom manager object is embedded |
| MyInstCont | A count indicating the number of phantom objects |

Figure 7:
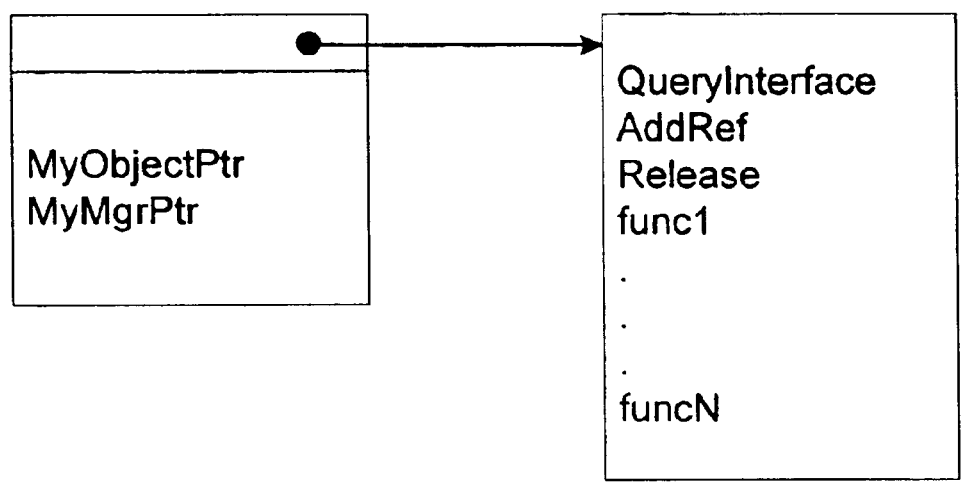
FIG. 7 is a block diagram illustrating the object layout of the phantom server class.

FIG. 7 is a block diagram illustrating the object layout of the phantom server class. The phantom server object inherits the server interface of the server class (e.g., "IServer").

The phantom server object provides an implementation of each function of the server interface. The implementations may forward their invocation to the corresponding function of the CT server object before or after performing custom processing on a per client basis. Table 2 describes data members of the phantom server class.

TABLE 2

| Member | Description |
|---|---|
| MyObjectPtr | Pointer to the corresponding CT object |
| MyMgrPtr | Pointer to the corresponding phantom manager object |

Figure 8:
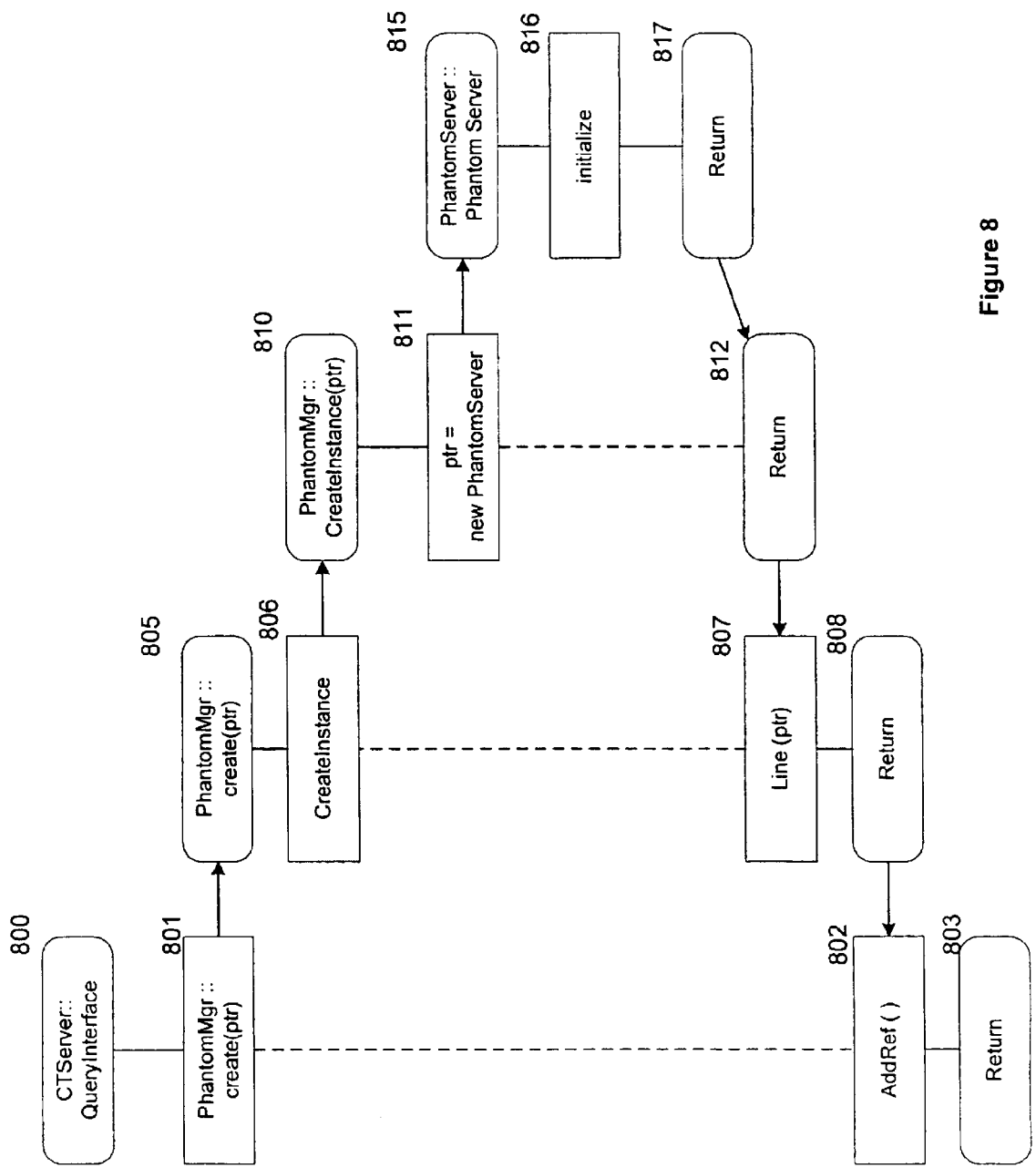
FIG. 8 is a diagram illustrating the processing to return to a client a pointer to a phantom server object rather than to the server object itself.

FIG. 8 is a diagram illustrating the processing to return to a client object a pointer to a phantom server object rather than to the server object itself. Steps 800–803 illustrate the processing of the query interface function of the CT server class. Steps 805–808 illustrate the processing of the create function of the phantom manager class. Steps 810–812 illustrate the processing of the create instance function of the phantom manager class. Steps 815–817 illustrate the processing of the constructor of the phantom server class. When the query interface function of a CT server object is invoked, the function invokes the create function of the phantom manager object as shown by the arrow from step 801 to step 805.

The create function of the phantom manager object invokes the create instance function of that same phantom manager object as shown by the arrow from step 806 to step 810. The create instance function instantiates a phantom server object in step 811 which invokes the constructor for the phantom server object as shown by the arrow from step 811 to step 815.

The constructor initializes the phantom server object as appropriate to the custom processing desired in step 816 and then returns to the create instance function as shown by the arrow from step 817 to step 812. The create instance function then returns to the create function as shown by the arrow from step 812 to step 807. The create function links the instantiated phantom server object to the phantom manager object and then returns to the query interface function of the CT server object as shown by the arrow from step 808 to step 802. In step 802, the query interface function invokes the add reference function and then returns with the pointer to the phantom server object.

Figure 9:
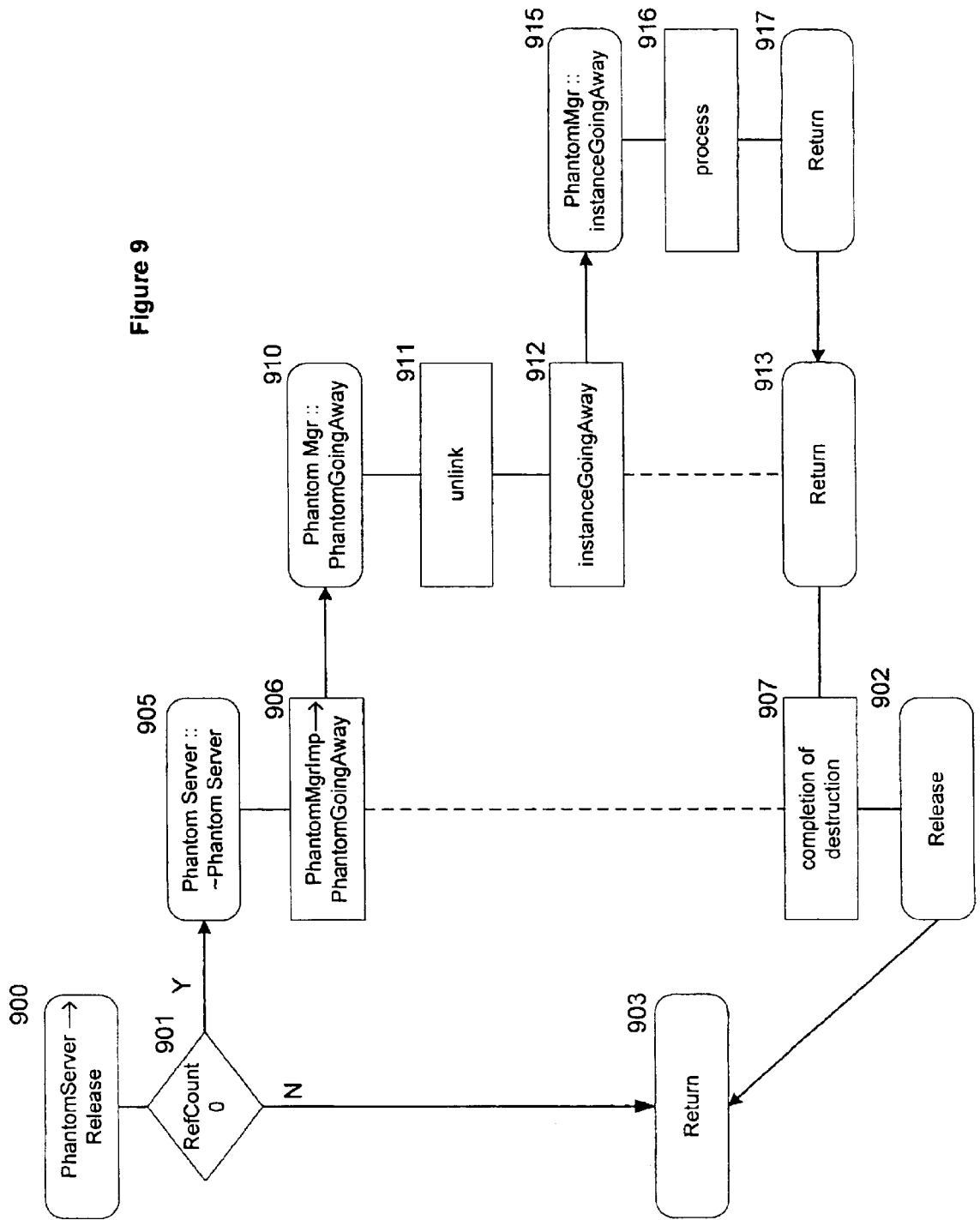
FIG. 9 is a diagram illustrating the processing of releasing a pointer to a phantom server object.

FIG. 9 is a diagram illustrating the processing of releasing a pointer to a phantom server object. Steps 900–903 illustrate the processing of the release function of the phantom server object. Steps 905–907 illustrate the processing of the destructor of the phantom server object. Steps 910–913 illustrate the processing of the phantom going away function of the phantom manager object. Steps 915–917 illustrate the processing of the instance going away function of the phantom manager object. When the release function of phantom server object is invoked and the reference count goes to 0, the function invokes the destructor of the phantom server object as shown by the arrow from step 901 to step 905. The destructor of the phantom server object invokes the phantom going away function of the phantom manager object as shown by the arrow from step 906 to step 910. The phantom going away function unlinks the phantom server object from a linked list of phantom server objects in step 911 and invokes the instance going away function in step 912 as shown by the arrow from step 912 to step 915. The instance going away function performs the custom processing of the client tracking system in step 916. The function then returns to the phantom going away function as shown by the arrow from step 917 to step 913. The phantom going away function then returns to the destructor as shown by the arrow from step 913 to step 907. The destructor then returns to the release function of the phantom server object as shown by the arrow from step 907 to step 902. In step 902, the release function completes the destruction, which may include invoking the release function of the CT server object. The release function then returns.

Figure 10:
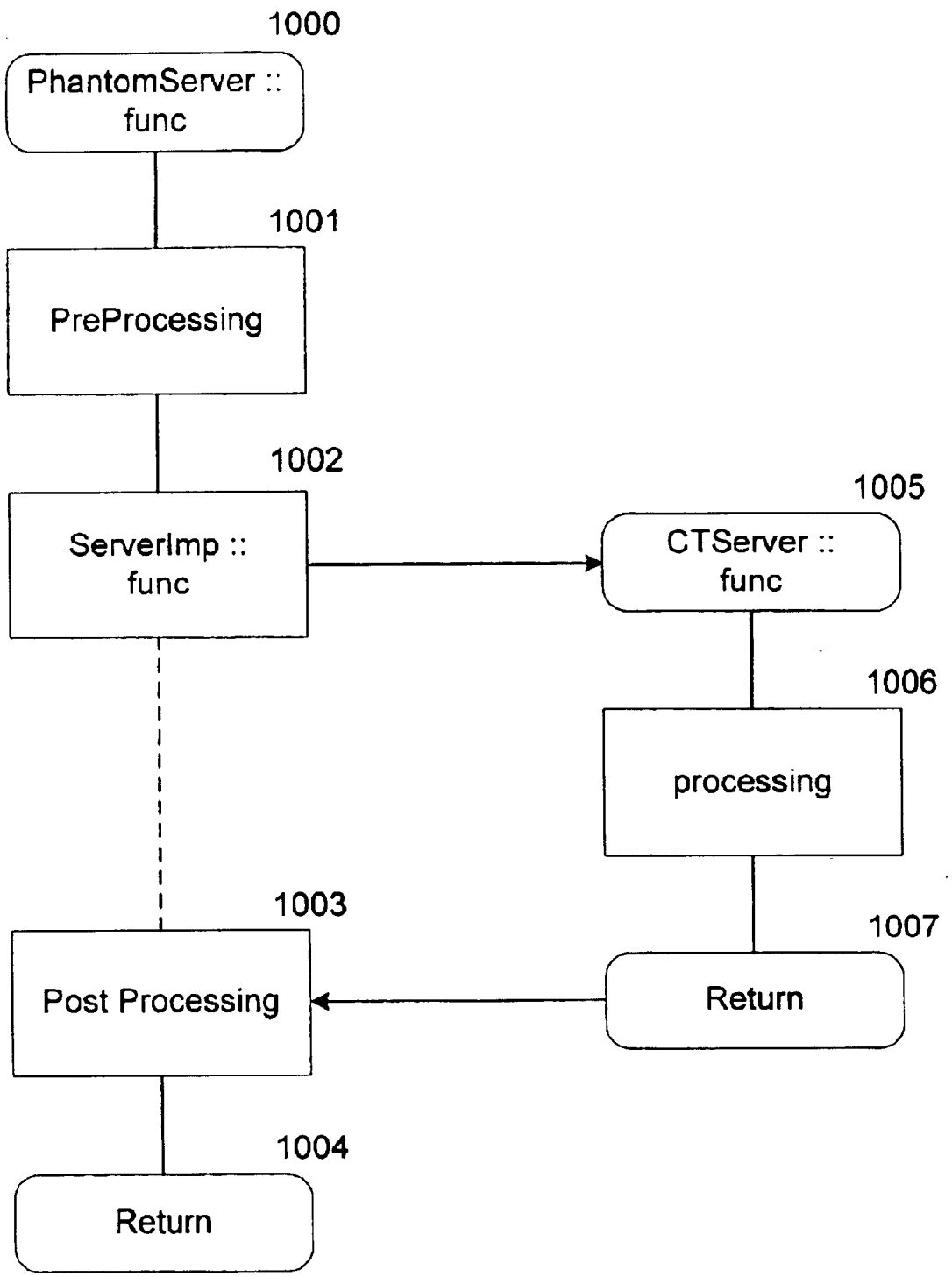
FIG. 10 is a diagram illustrating the forwarding of a function invocation from a phantom server function to a CT server function.

FIG. 10 is a diagram illustrating the forwarding of a function invocation from a phantom server function to a CT server function. Such forwarding would be for each function of the server class. Steps 1000–1004 illustrate the processing of a function of a phantom server object. Steps 1005–1007 illustrate the processing of the function of that server object. When the function of the phantom server object is invoked, the function may perform custom preprocessing in step 1001. The function then forwards the invocation to the function of the CT server object as indicated by the arrow from step 1002 to step 1005. The function of the CT server object performs its processing in step 1006 and then returns as shown by the arrow from step 1007 to step 1003. In step 1003, the function performs any custom post processing and then returns.

Figure 11:
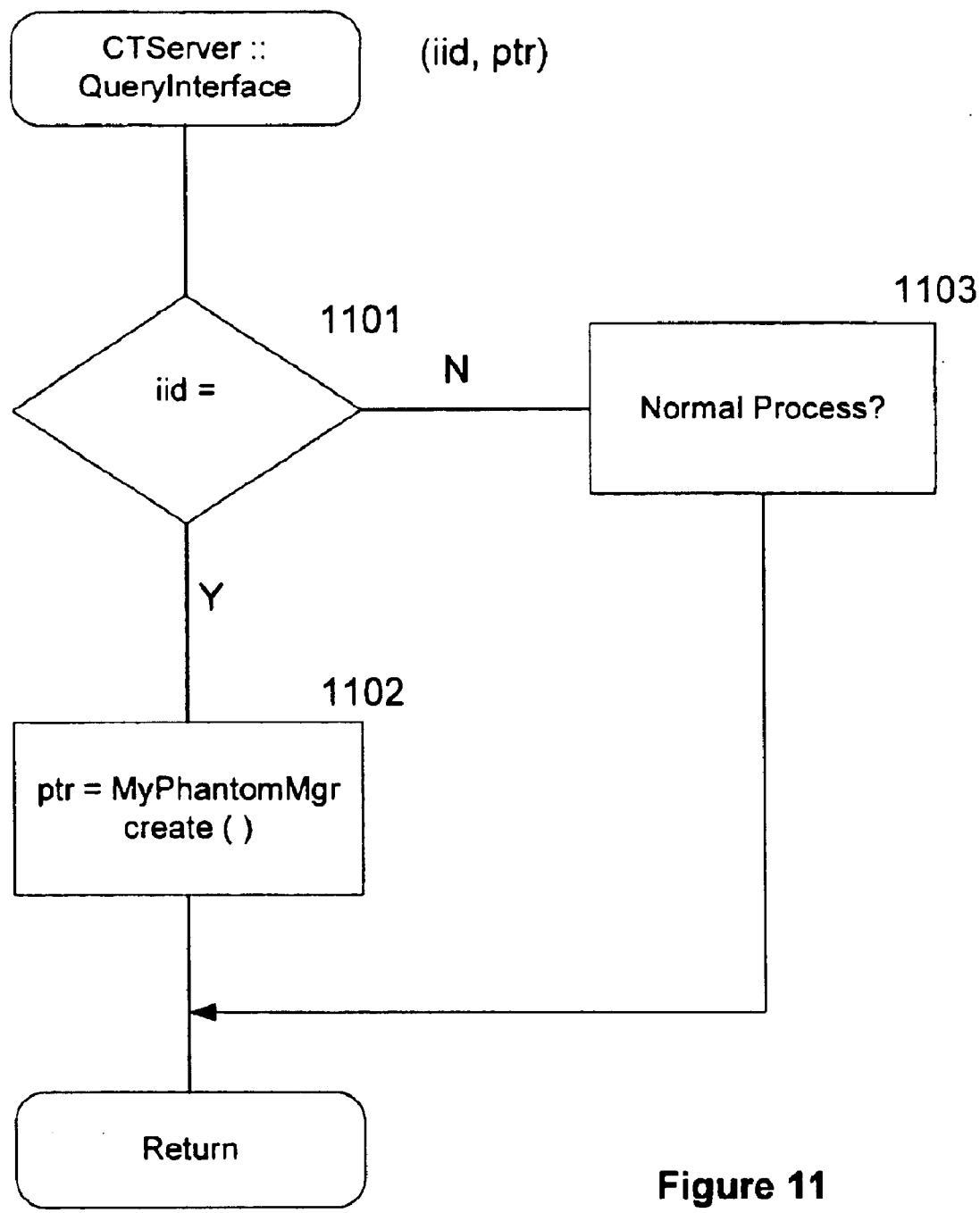
FIG. 11 is a flow diagram of an example implementation of the query interface function of the client tracking server class.

FIGS. 11–21 are flow diagrams of example implementations of functions of the client tracking server class, the phantom manager class, and the phantom server class. FIG. 11 is a flow diagram of the query interface function of the client tracking server class. This function corresponds to the query interface function of the IUknown interface. This function is passed the identification of an interface and returns a pointer to the interface. The implementation of this function in the client tracking server class, which inherits the server class, overrides the implementation of this function in the server class. In step 1101, if the passed interface identifier is for an interface that is to be tracked, then the function continues at step 1102, else the function continues at step 1103. In step 1102, the function invokes the create function of the phantom manager object to create a phantom server object and then returns the pointer to the phantom server object. In step 1103, the function performs the normal processing of the query interface function of the server class and then returns.

Figure 12:
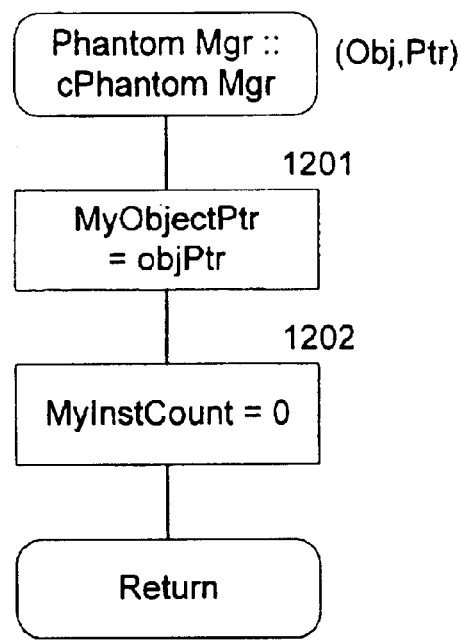
FIG. 12 is a flow diagram of an example implementation of the constructor of the phantom manager class.

FIGS. 12–15 are flow diagrams of example implementations of functions of the phantom manager class. FIG. 12 is a flow diagram of the constructor of the phantom manager class. A phantom manager object is instantiated when the instance of the client tracking server object is instantiated. Alternatively, the instantiation could be deferred until an interface to be tracked is requested by a client. The phantom manager object can be instantiated as a data member of the client tracking server object or can be dynamically instantiated. The constructor is passed a pointer to the client tracking server object. In step 1201, the constructor sets a data member to point to the passed client tracking server object. In step 1202, the constructor initializes a count of the instantiated phantom server objects and then returns.

Figure 13:
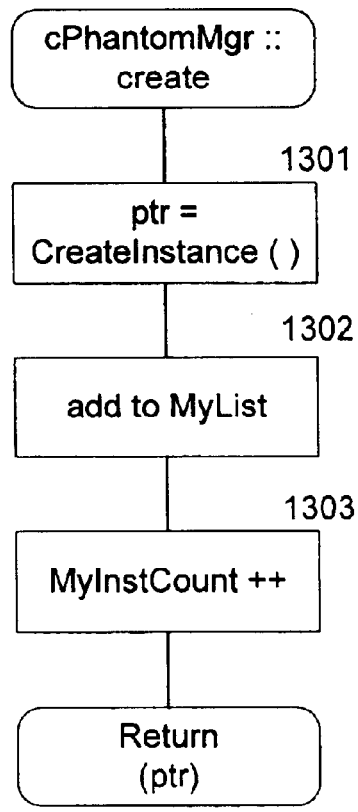
FIG. 13 is a flow diagram of an example implementation of the create function of the phantom manager class.

FIG. 13 is a flow diagram of the create function of the phantom manager class. This function instantiates a phantom server object, links it to a list for tracking, and returns a pointer to it. In step 1301, the function invokes the create instance function of the phantom manager object and receives a pointer to the instantiated phantom server object. In step 1302, the function adds the phantom server object to a list of phantom server objects. In step 1303, the function increments the count of the instantiated phantom server objects and then returns a pointer to the phantom server object.

Figure 14:
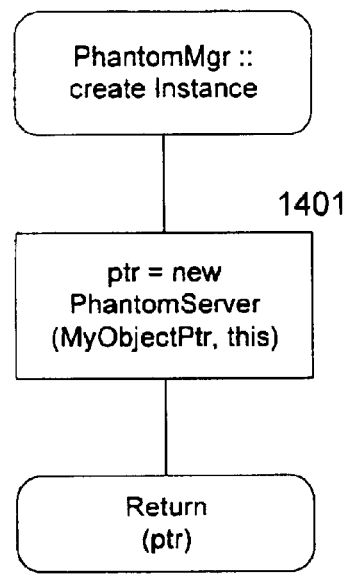
FIG. 14 is a flow diagram of an example implementation of the create instance function of the phantom manager class.

FIG. 14 is a flow diagram of the create instance function of the phantom manager class. An implementation of this function is provided for each type of phantom server object. In one embodiment, a client tracking server object can have multiple phantom managers, that is one for each type of interface for which a pointer can be returned. The query interface function of the client tracking server object can select the appropriate phantom manager object. In step 1401, the function instantiates a phantom server object passing a pointer to the client tracking server object and a pointer to the phantom manager object. The function then returns a pointer to the instantiated phantom server object.

Figure 15:
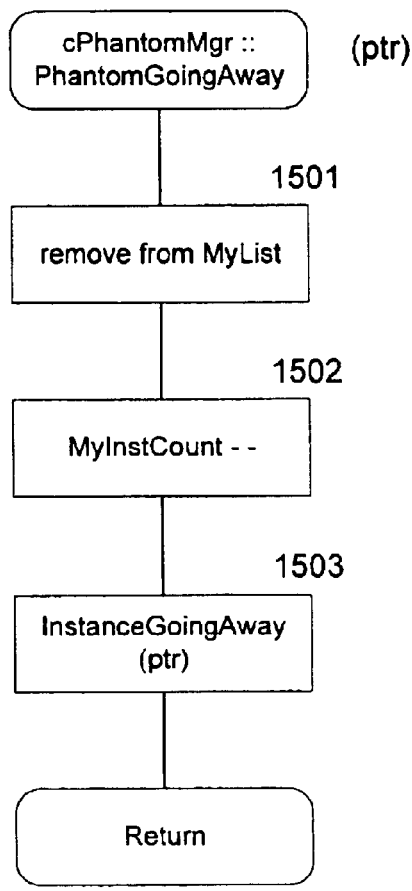
FIG. 15 is a flow diagram of an example implementation of the phantom going away function of the phantom manager class.

FIG. 15 is a flow diagram of the phantom going away function of the phantom manager class. This function is invoked when a phantom server object is being destructed.

This removes the phantom server object from the list and invokes the instance going away function. An implementation of the instance going away function is provided by the developer of the client tracking server class to perform any custom processing when a client releases a pointer to the phantom server object and its reference count goes to 0. In step 1501, the function removes the phantom server object from the list. In step 1502, the function decrements the count of phantom server objects. In step 1503, the function invokes the instance going away function and then returns.

Figure 16:
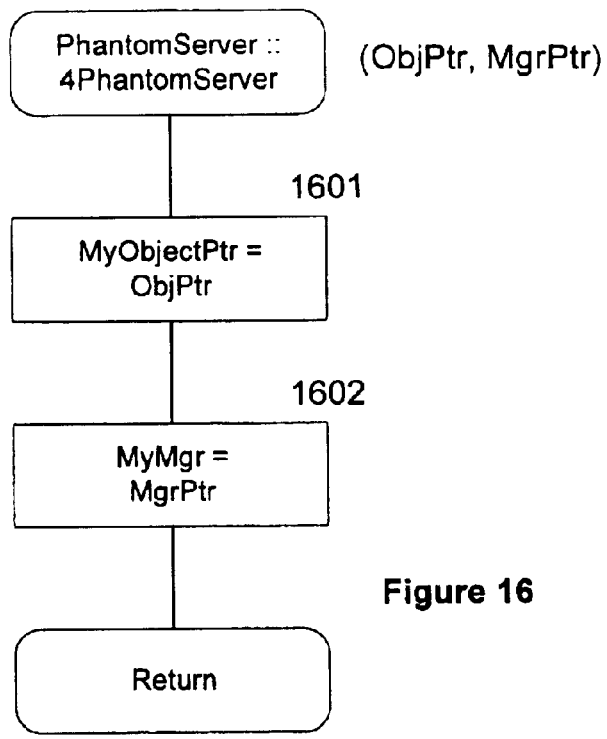
FIG. 16 is a flow diagram of an example implementation of the constructor of the phantom server class.

FIGS. 16–21 are flow diagrams of example implementations of functions of the phantom server class. FIG. 16 is a flow diagram of the constructor of the phantom server class. This constructor is passed a pointer to the client tracking server object and a pointer to the phantom manager object. In step 1601, the constructor sets a data member to point to the client tracking server object. In step 1602, the constructor sets a data member to point to the phantom manager object. The function then returns.

Figure 17:
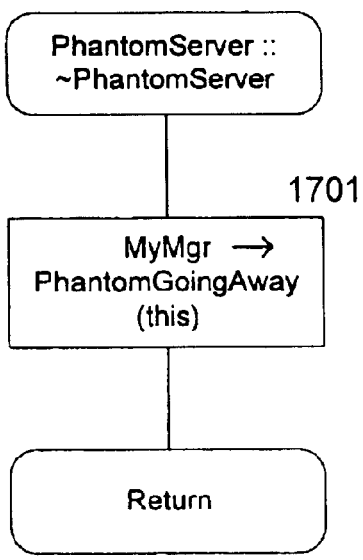
FIG. 17 is a flow diagram of an example implementation of the destructor of the phantom server class.

FIG. 17 is a flow diagram of the destructor of the phantom server class. In step 1701, the destructor invokes the phantom going away function of the phantom manager object passing a pointer to the phantom server object. The destructor then returns.

Figure 18:
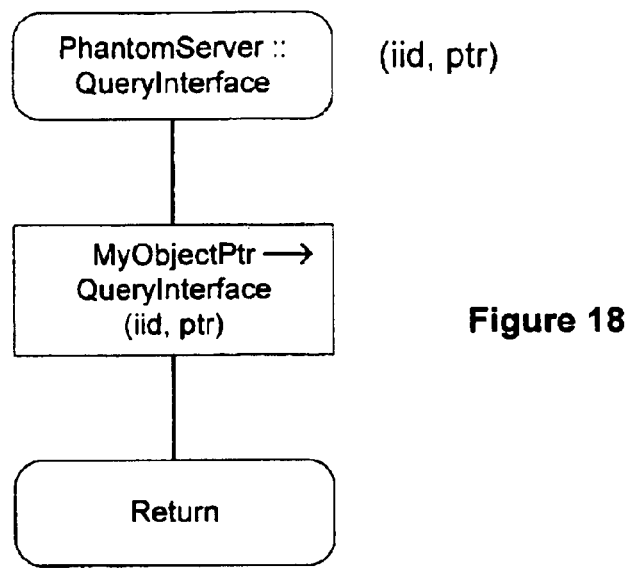
FIG. 18 is a flow diagram of an example implementation of the query interface function of the phantom server class.

FIG. 18 is a flow diagram of the query interface function of the phantom server class. In step 1801, the query interface function forwards its invocation to the query interface function of the client tracking server object. The function then returns.

Figure 19:
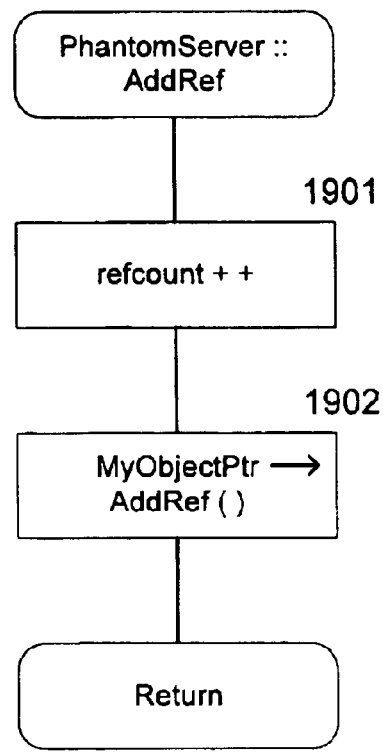
FIG. 19 is a flow diagram of an example implementation of the add reference function of the phantom server class.

FIG. 19 is a flow diagram of the add reference function of the phantom server class. In step 1901, the function increments the reference count of the phantom server object. In step 1902, the function forwards its invocation to the client tracking server object and then returns.

Figure 20:
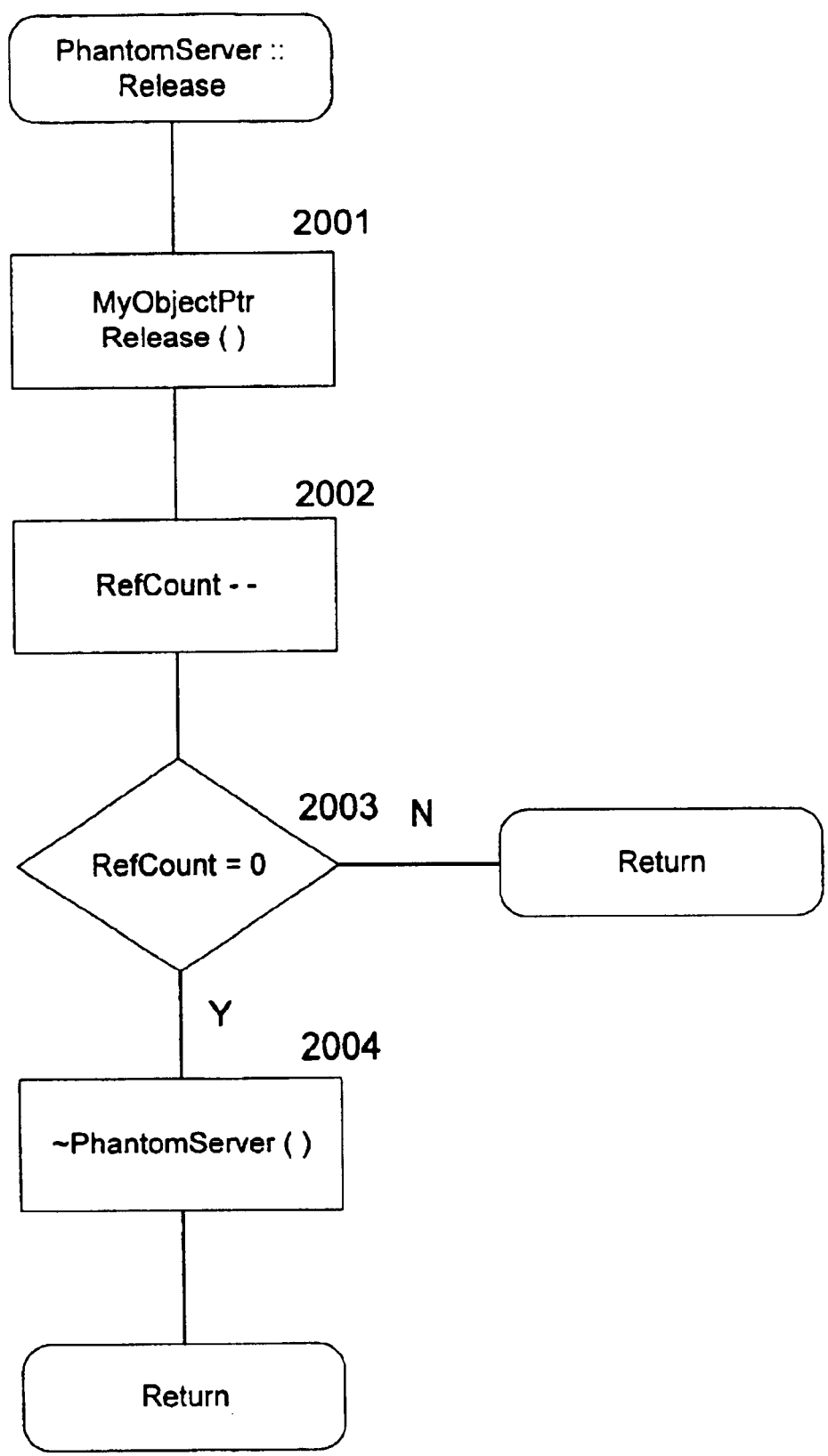
FIG. 20 is a flow diagram of an example implementation of the release function of the phantom server class.

FIG. 20 is a flow diagram of the release function of the phantom server class.

In step 2001, the function forwards its invocation to the client tracking server object. In step 2002, the function decrements the reference count of the phantom server object. In step 2003, if the reference count is equal to 0, then the function continues at step 2004, else the function returns. In step 2004, the function invokes the destructor of the phantom server object and then returns.

Figure 21:
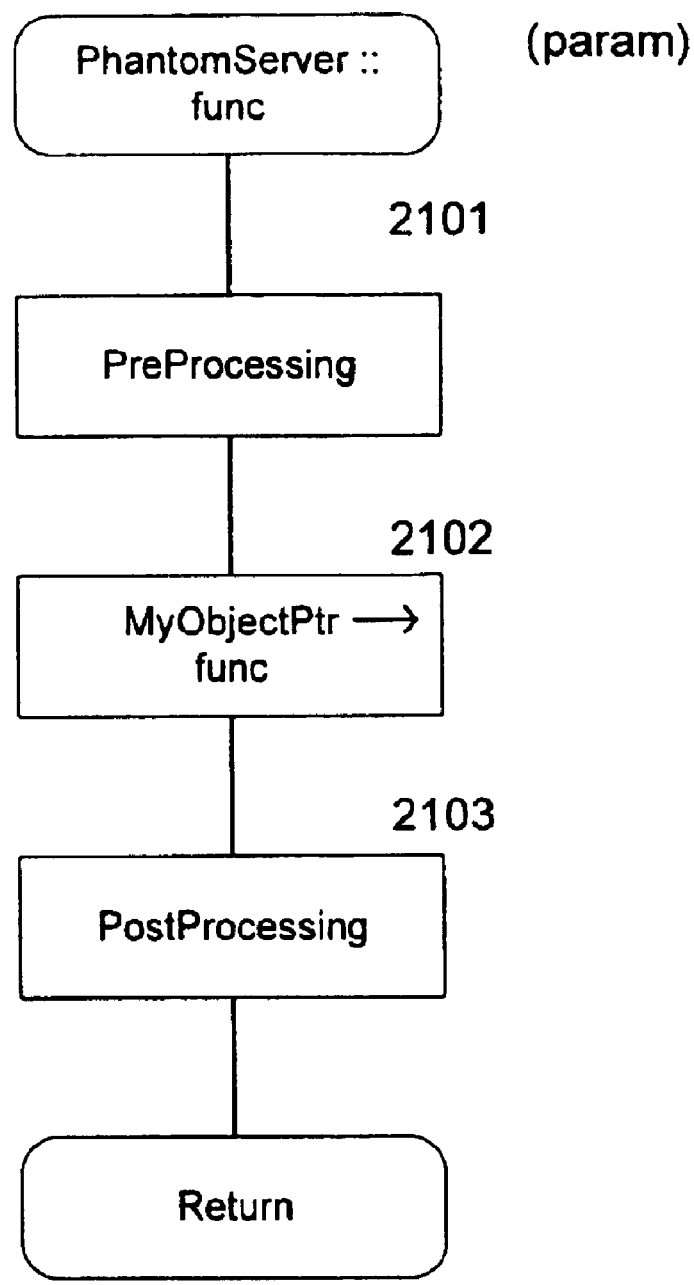
FIG. 21 is a flow diagram of an example implementation of a function of the phantom server class that is inherited from the interface of the server class.

FIG. 21 is a flow diagram of an example implementation of a function of the phantom server class that is inherited from the interface of the server class. In step 2101, the function performs custom preprocessing. In step 2102, the function forwards the invocation to the corresponding function of the client tracking server object. In step 2103, the function performs custom post processing. The function then returns.

Based on the above description, it will be appreciated that, although specific embodiments of the invention have been described herein for purposes of illustration, various modifications may be made without deviating from the spirit and scope of the invention. For example, the term "client" encompasses any type of software component such as module, process, or thread, and is not limited to an object in the object-oriented sense. In addition, the phantom manager may not be a separate object. Rather, its behavior can be integrated into the implementation of the query function of the client tracking server class. The integration may be appropriate when it is not desired to perform custom processing when a phantom server object is created or destroyed. Also, a server class can be defined initially or modified to include the behavior of the phantom manager class so that objects can be tracked. Also, a phantom server object can also have a phantom-phantom server object associated with it to track various sub-clients of a client. For example, a derivation of the phantom server class could implement client tracking on the phantom server object itself. The principles of the present invention may be used in environments where a server can be dynamically cast. Microsoft's COM is such an environment and the query interface function of the IUnknown interface provides dynamic casting. Accordingly, the invention is not limited except as by the appended claims.

What is claimed:

1. A computer program stored on a computer readable medium for a client tracking system, including:
   a client tracking server object derived from a server class that provides an implementation of a query interface function that overrides the query interface function of the server class, wherein a phantom manager object is a data member of the client tracking server class, wherein a phantom server object is installed when the query interface function of the client tracking server class is invoked, wherein a class of the phantom server object is inherited from the server class, and wherein when a client object invokes a function of a phantom server object of the phantom server object, the function is custom processed by the phantom server object before forwarding the invocation of the function to the client tracking server object.

2. A computer program according to claim 1, wherein the phantom manager class of the phantom manager object inherits from a base phantom manager class that includes at least one of (1) a phantom going away function that is invoked by a phantom server object to notify the phantom manager object that the phantom server object is being destructed, (2) a get object pointer function that returns a pointer to an embedding client tracking object, (3) a create function that is invoked by the query interface function of the client tracking server object to create a phantom server object, (4) a get phantom count function that returns the number of phantom server objects currently managed by the phantom manager object, (5) a create instance function that instantiates a phantom server object and that is invoked by the create function and (6) an instance going away function that is invoked by the phantom going away function.

3. A computer program according to claim 1, wherein the phantom manager class of the phantom manager object inherits from a base phantom manager class that includes at least one of (1) a my list pointer data member that provides a pointer to phantom server objects managed by the phantom manager object, (2) a my object pointer data member that provides a pointer to a client tracking server object in which the phantom manager object is embedded and (3) a may count data member that provides a count indicative of the number of phantom server objects managed by the phantom manager object.

4. A computer program stored on a computer readable medium for a client tracking system, including:
   a client tracking server object derived from a server class that provides an implementation of a query interface function wherein if the query interface function invokes a second function according to convention, then the second function is overridden, wherein a phantom server class that includes functions that correspond to the functions of the server class and that have the same signature as the corresponding function of the server class is provided; wherein a phantom manager class that includes a create function for instantiating a phantom server object of the phantom server class and returns a reference to the phantom server object is provided; wherein a client tracking server class that is a derivation of the server class wherein the query function of the client tracking server class invokes the create function of the phantom manager class is provided; wherein a client tracking Server object is instantiated; wherein the query function of the client tracking server object is invoked; wherein the query function invokes the create function of a phantom manager object which instantiates a phantom server object; wherein the query function returns a reference to the phantom server object.

* * * * *

UNITED STATES PATENT AND TRADEMARK OFFICE
CERTIFICATE OF CORRECTION

PATENT NO. : 7,353,271 B2
APPLICATION NO. : 10/723121
DATED : April 1, 2008
INVENTOR(S) : Richard Hasha Page 1 of 1

It is certified that error appears in the above-identified patent and that said Letters Patent is hereby corrected as shown below:

In column 12, line 20, in Claim 1, delete "installed" and insert -- instantiated --, therefor.

In column 12, line 50, in Claim 3, delete "may" and insert -- my --, therefor.

In column 13, line 4, in Claim 4, delete "Server" and insert -- server --, therefor.

Signed and Sealed this
Twenty-second Day of February, 2011

David J. Kappos
*Director of the United States Patent and Trademark Office*